US011640194B2

(12) United States Patent
Masters

(10) Patent No.: US 11,640,194 B2
(45) Date of Patent: May 2, 2023

(54) COORDINATING DYNAMIC POWER SCALING OF AGENTS BASED ON POWER CORRELATIONS OF AGENT INSTRUCTIONS

(71) Applicant: Red Hat, Inc., Raleigh, NC (US)

(72) Inventor: Jonathan C. Masters, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 120 days.

(21) Appl. No.: 17/361,627

(22) Filed: Jun. 29, 2021

(65) Prior Publication Data

US 2022/0413578 A1 Dec. 29, 2022

(51) Int. Cl.
*G06F 1/3206* (2019.01)
*G06F 1/3296* (2019.01)
*G06F 1/324* (2019.01)
*G06F 12/0842* (2016.01)

(52) U.S. Cl.
CPC ............ *G06F 1/3206* (2013.01); *G06F 1/324* (2013.01); *G06F 1/3296* (2013.01); *G06F 12/0842* (2013.01); *G06F 2212/603* (2013.01)

(58) Field of Classification Search
CPC ...... G06F 1/3206; G06F 1/324; G06F 1/3296; G06F 11/3058; G06F 12/0842; G06F 2212/603
See application file for complete search history.

(56) References Cited

U.S. PATENT DOCUMENTS

| 8,024,590 | B2 | 9/2011 | Song et al. |
| 8,190,931 | B2* | 5/2012 | Laurenti ............... G06F 11/348 |
| | | | 713/340 |
| 8,219,833 | B2 | 7/2012 | Basak et al. |
| 8,788,993 | B2 | 7/2014 | Gangadharan et al. |
| 9,395,777 | B2 | 7/2016 | Kim et al. |
| 11,307,634 | B1* | 4/2022 | Masters ............... G06F 1/3296 |

(Continued)

FOREIGN PATENT DOCUMENTS

CN 107209545 B 10/2020

OTHER PUBLICATIONS

Acun, Bilge, et al. "Fine-Grained Energy Efficiency Using Per-Core DVFS with an Adaptive Runtime System". 2019 Tenth International Green and Sustainable Computing Conference (IGSC). 2019. IEEE. (Year: 2019).*

(Continued)

*Primary Examiner* — Thomas J. Cleary
(74) *Attorney, Agent, or Firm* — Dority & Manning, P.A.

(57) ABSTRACT

Coordinating dynamic power scaling of agents based on power correlations of agent instructions is disclosed. A global power controller determines a first local power quantifier of a first agent executing an agent instruction of a task of a workload. The global power controller stores a correlation between the first agent executing the agent instruction and a second local power quantifier corresponding to a second agent. The global power controller subsequently determines that the first agent is executing or will execute the agent instruction. The global power controller accesses the correlation associated with the first agent executing the agent instruction and sends to the second agent a proposed power level based on the correlation.

20 Claims, 11 Drawing Sheets

(56) References Cited

U.S. PATENT DOCUMENTS

| | | | | |
|---|---|---|---|---|
| 2009/0199020 | A1* | 8/2009 | Bose | G06F 1/3287 |
| | | | | 713/300 |
| 2011/0046804 | A1* | 2/2011 | Fong | G06F 1/3296 |
| | | | | 700/291 |
| 2011/0296149 | A1* | 12/2011 | Carter | G06F 1/3203 |
| | | | | 712/E9.035 |
| 2018/0260229 | A1* | 9/2018 | Masters | G06F 1/3225 |
| 2019/0204902 | A1* | 7/2019 | Gibney | G06F 1/28 |
| 2019/0384370 | A1* | 12/2019 | Kim | G06F 1/08 |
| 2020/0050920 | A1* | 2/2020 | Idgunji | G06N 3/082 |
| 2020/0183485 | A1* | 6/2020 | Das | G06F 1/324 |
| 2021/0042157 | A1* | 2/2021 | Kim | G06F 1/324 |
| 2022/0100257 | A1* | 3/2022 | Bharadwaj | G06F 1/3228 |
| 2022/0197367 | A1* | 6/2022 | Kirubakaran | G06F 1/3287 |

OTHER PUBLICATIONS

Chang, X. et al., "Adaptive Clock Gating Technique for Low Power IP Core in SoC Design," 2007 IEEE International Symposium on Circuits and Systems (ISCAS), May 27-30, 2007, New Orleans, LA, USA, IEEE, pp. 2120-2123.

Shepard, P., "Multi-Rail Power Sequencer and Monitor IP Blocks Reference Design," Sep. 10, 2019, EETech Media, LLC, https://eepower.com/news/multi-rail-power-sequencer-and-monitor-ip-blocks-reference-design/, 5 pages.

* cited by examiner

# COORDINATING DYNAMIC POWER SCALING OF AGENTS BASED ON POWER CORRELATIONS OF AGENT INSTRUCTIONS

BACKGROUND

Modern processing units utilize dynamic voltage and frequency scaling (DVFS) to adjust operating points to workload.

SUMMARY

The examples disclosed herein coordinate dynamic power scaling of agents based on power correlations of agent instructions. A global power controller determines a first local power quantifier of a first agent executing an agent instruction of a task of a workload. The global power controller stores a correlation between the first agent executing the agent instruction and a second local power quantifier corresponding to a second agent. The global power controller subsequently determines that the first agent is executing or will execute the agent instruction. The global power controller accesses the correlation associated with the first agent executing the agent instruction and sends to the second agent a proposed power level based on the correlation.

In one example, a method is provided. The method includes determining, by a global power controller, a first local power quantifier that corresponds to a first voltage and/or a first frequency of a first agent executing an agent instruction of a task of a workload. The method further includes storing, by the global power controller, a correlation between the first agent executing the agent instruction and a second local power quantifier corresponding to a second voltage and/or a second frequency of a second agent. The method further includes subsequently determining, by the global power controller, that the first agent is executing or will execute the agent instruction. The method further includes accessing, by the global power controller, the correlation associated with the first agent executing the agent instruction. The method further includes sending, by the global power controller to the second agent, a proposed power level based on the correlation.

In another implementation, a system is disclosed. The system includes one or more processor devices to determine, by a global power controller, a first local power quantifier that corresponds to a first voltage and/or a first frequency of a first agent executing an agent instruction of a task of a workload. The one or more processor devices to store, by the global power controller, a correlation between the first agent executing the agent instruction and a second local power quantifier corresponding to a second voltage and/or a second frequency of a second agent. The one or more processor devices to subsequently determine, by the global power controller, that the first agent is executing or will execute the agent instruction. The one or more processor devices to access, by the global power controller, the correlation associated with the first agent executing the agent instruction. The one or more processor devices to send, by the global power controller to the second agent, a proposed power level based on the correlation.

In another implementation, a computer program product is disclosed. The computer program product is stored on a non-transitory computer-readable storage medium and including instructions to cause a processor device to determine, by a global power controller, a first local power quantifier that corresponds to a first voltage and/or a first frequency of a first agent executing an agent instruction of a task of a workload. The instructions to further cause the processor device to store, by the global power controller, a correlation between the first agent executing the agent instruction and a second local power quantifier corresponding to a second voltage and/or a second frequency of a second agent. The instructions to further cause the processor device to subsequently determine, by the global power controller, that the first agent is executing or will execute the agent instruction. The instructions to further cause the processor device to access, by the global power controller, the correlation associated with the first agent executing the agent instruction. The instructions to further cause the processor device to send, by the global power controller to the second agent, a proposed power level based on the correlation.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
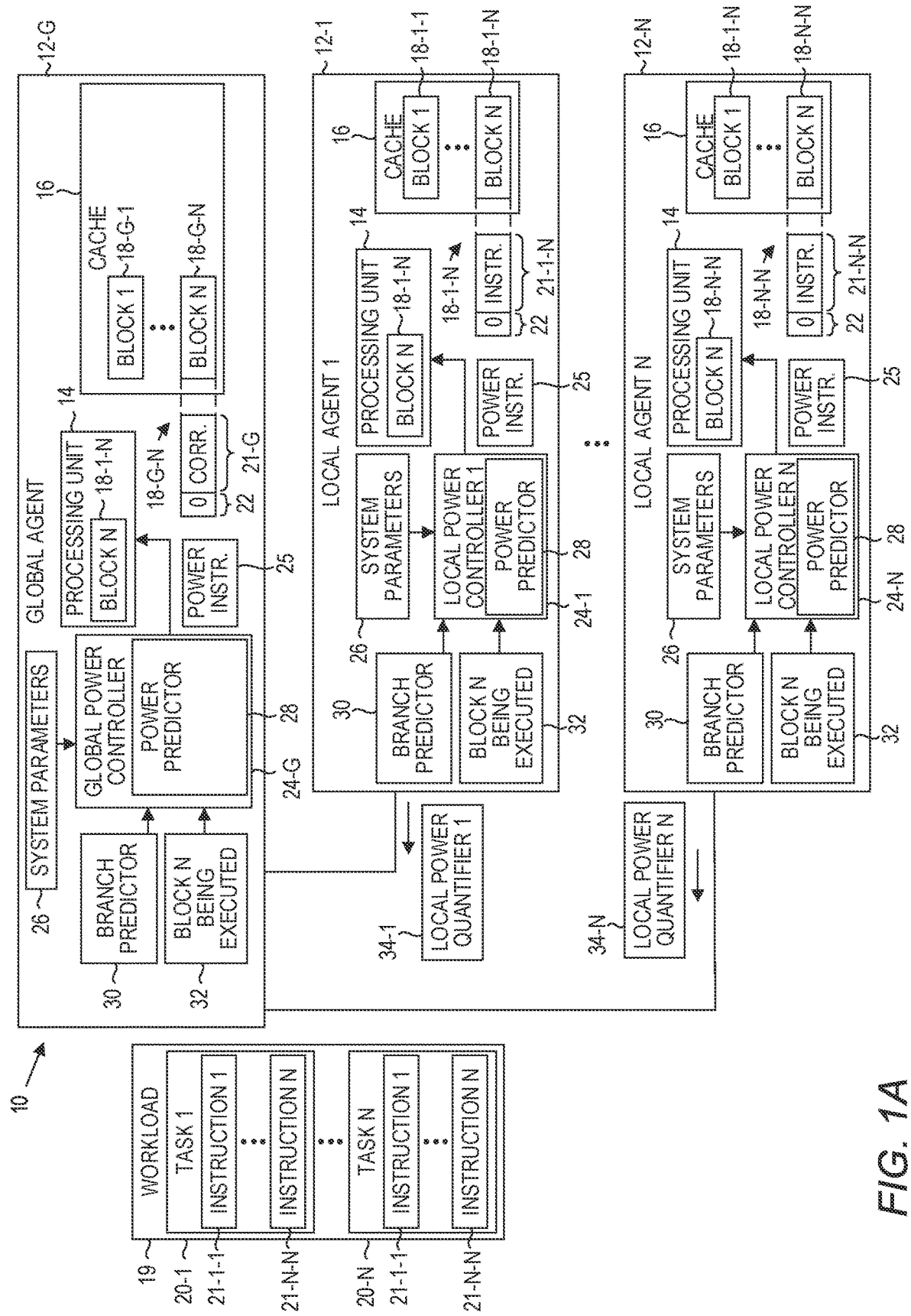
FIGS. 1A-1D are block diagrams of a system at different points in time according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Processing units of agents utilize dynamic voltage and frequency scaling (DVFS) to adjust operating points to workload. It can take a period of time for the state of an agent to change from one voltage or frequency to another voltage or frequency. Such changes may be interrelated across multiple different agents, such as where a first agent executes a first instruction of a task of a workload, and a second agent concurrently or consecutively executes a second instruction of a second task of a workload. The examples disclosed herein coordinate power levels across multiple agents that are associated with the execution of one or more instructions of a task of a workload, thereby providing extremely time-sensitive adjustments. A global power controller subsequently determines that an instruction is executing or is to be executed by a first local agent at a future point in time. The global power controller obtains and provides an instruction power level to a second local agent to adjust voltage and/or frequency of the second local agent.

FIGS. 1A-1D are block diagrams of a system 10 at different points in time, according to one example. In certain implementations, the system 10 is a package, such as an integrated circuit (IC) package or system on a chip (SoC). An SoC integrates all or most components of a computer, such as a central processing unit (CPU), memory, input/output (I/O) ports, graphics processing unit (GPU), and the like.

The system 10 includes a plurality of agents 12-G, 12-1-12-N (referred to generally as agents 12), which may be processor devices. The agents 12 may include one or more processing units 14 (only one is illustrated for purposes of space), which may be one or more processing cores. The agent 12 and/or processing unit 14 may include, for example, CPU, GPU, memory, communication, input/output, or the like. In certain implementations, the system 10 includes a package, and the agents 12 include chiplets. Chiplets are sub-processing units that collectively form a processing unit of a package. A chiplet has an integrated circuit block, often made of one or more reusable IP (intellectual property) blocks, designed to work with other chiplets to form more complex chips.

Each agent 12 may include a processing unit 14 and/or a cache 16 in which cache blocks 18-G-1-18-N-N(generally, cache blocks 18, and sometimes referred to as cache lines) are stored prior to execution by the processing unit 14. In particular, global agent 12-G includes cache blocks 18-G-1-18-G-N(referred to as cache blocks 18-G), local agent 12-1 includes cache blocks 18-1-1-18-1-N(referred to as cache blocks 18-1), and local agent 12-N includes cache blocks 18-N-1-18-N-N(referred to as cache blocks 18-N).

The system 10 may process a workload 19, including at least one task 20-1, 20-N(may be referred to as tasks 20). Each task 20 may include one or more agent instructions 21-1-1-21-N-N. For example, task 20-1 includes agent instructions 21-1-1-21-1-N, while task 20-N includes agent instructions 21-N-1-21-N-N. Each task 20 may be assigned to one or more agents 12. For example, task 20-1 may be assigned to local agent 12-1, while task 20-N may be assigned to local agent 12-N. In certain implementations, each task 20 may be executed in about 500 nanoseconds, while each agent instruction 21 may be executed within one nanosecond.

At least some cache blocks 18-G of the global agent 12-G include data identifying one or more correlations 21-G between different local agents 12-1, 12-N executing agent instructions 21-1, 21-N, and metadata 22. In certain implementations, the cache blocks 18-G may include one or more agent correlations 21-G, agent instructions 21-1, 21-N, and/or metadata 22. It is noted that the global agent 12-G may include agent instructions 21-1, 21-N as well, if the global agent 12-G executes any agent instructions 21-1, 21-N. The data identifying the one or more correlations 21-G and/or agent instructions 21-1, 21-N may comprise a reference to another cache 16, or a location in a different memory where the correlations 21-G and/or agent instructions 21-1, 21-N are located, or may comprise the actual correlations 21-G and/or agent instructions 21-1, 21-N.

Each cache block 18-1, 18-N of the local agents 12-1, 12-N includes data identifying one or more agent instructions 21-1, 21-N and metadata 22 (e.g., information) about the agent instructions 21-1, 21-N. The data identifying the one or more agent instructions 21-1, 21-N may comprise a reference to another cache 16, or a location in a different memory where the agent instructions 21-1, 21-N are located, or may comprise the actual agent instructions 21-1, 21-N.

The correlations 21-G associate behavior and/or power levels between agents 12 based on execution of an instruction 21 of a task 20. The correlations 21-G may associate execution of an agent instruction 21-1-1 of a task 20-1 by an agent 12-1 with operation of a local agent 12-N. For example, the correlation 21-G may associate execution of agent instruction 21-1-1 of task 20-1 by local agent 12-1 with execution of agent instruction 21-N-N of task 20-N by local agent 12-N.

Each agent 12 may include a power controller 24-G, 24-1-24-N (referred to generally as a power controller 24) that controls voltage and/or frequency of the respective processing unit 14 via power instructions 25. The power controller 24 may control the voltage and/or frequency through one or more DVFS states, each state corresponding to a different voltage and/or frequency. The power controller 24 dynamically determines the power instructions 25 at an instant in time based on one or more system parameters 26, which may include, by way of a non-limiting example, a temperature of the one or more processor units 14, a total electrical current usage by the one or more processor units 14, an instantaneous workload experienced by the one or more processor units 14, and the like. The particular system parameters 26 utilized by the power controller 24 may differ depending on a manufacturer and/or design of the processor unit 14.

Each power controller 24 may include a power predictor 28, although in some implementations, the power predictor 28 is separate from and in communication with the power controller 24. The local power controllers 24-1, 24-N operate to provide proposed power levels for agent instructions 21 that are to be imminently executed by the local agent 12-1, 12-N based on previous power states of the processing unit 14 when executing the same agent instructions 21.

An example of an operation of the local power controller 24-1 includes continuously receiving information from a branch predictor 30 identifying agent instructions 21 that are to be executed by the processor unit 14 at an imminent future point in time. The local power controller 24-1 also receives executing information 32 regarding what agent instructions 21 are currently being executed. In this implementation, the local power controller 24-1 receives information that identifies the particular cache block 18 that is being executed, although it is apparent other information could be provided to the local power controller 24-1 to identify agent instructions 21 that are currently being executed. In this example, the local power controller 24-1 determines that the agent instructions 21-1-N of the cache block 18-1-N are being executed. The local power controller 24-1 also continuously receives or generates a real-time local power quantifier 34-1 that corresponds to a voltage or frequency of the processor unit 14 while executing the agent instructions 21 contained in the cache block 18-1-N. The local power quantifier 34-1 may take any form, and in some implementations, may comprise a particular DVFS state of a plurality of possible DVFS states to which the processor unit 14 can be set by the power controller 24. The components discussed herein, such as the power predictor 28 and the power controller 24, may be implemented in any desired manner, such as in silicon, firmware, application-specific integrated circuits (ASICs), field-programmable gate arrays (FPGAs), or programmable processor devices.

It is noted that the global agent 12-G and the local agent 12-N may operate similarly as described regarding local agent 12-1. Further, the local power quantifier 34-1 of local agent 12-1 and the local power quantifier 34-N of the local agent 12-N are sent to the global agent 12-G. These local power quantifiers 34-1, 34-N may be automatically sent by the local agents 12-1, 12-N, and/or requested by the global agent 12-G.

Figure 1B:
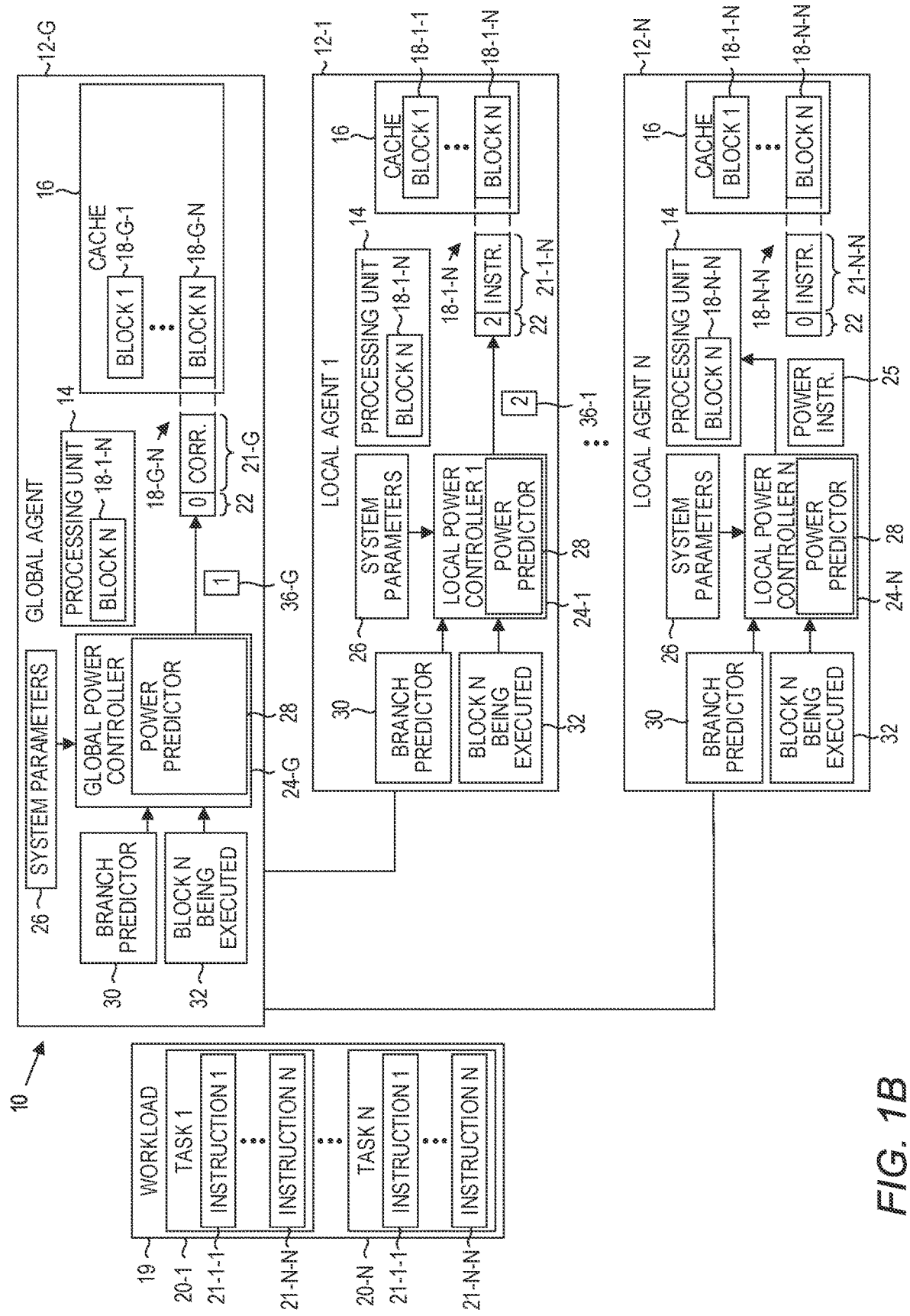

Referring now to FIG. 1B, the local power controller 24-1, based on the local power quantifier 34-1 and the executing information 32 that identifies the agent instructions 21-1-N in the cache block 18-1-N as currently being executed, stores an instruction power level 36-1 in association with the agent instructions 21-1-N in the cache block 18-1-N. In particular, the power predictor 28 stores the instruction power level 36-1 in the metadata 22 of the cache block 18-1-N. The instruction power level 36-1 may be the same value as the power quantifier 34-1 or may be translated to a different value. In some implementations, the processor core power quantifier 34 and the instruction power level 36 is a DVFS state.

It is noted that the global agent 12-G and the local agent 12-N may operate similarly as that described regarding local agent 12-1.

Additionally, the global power controller 24-G, based on the local power quantifiers 34-1, 34-2 and the executing information 32 that identifies the agent instructions 21-1-N currently being executed, stores a correlation 36-G in association with the agent instructions 21-1-N of the local agent 12-1 in the cache block 18-G-N. In particular, the power predictor 28 stores the correlation 36-G in the metadata 22 of the cache block 18-G-N. The correlation 36-G may be the same value as the power quantifier 34-1, 34-2 or may be translated to a different value. In some implementations, the correlation 36-G is a DVFS state, a request to turn on, and/or a request to turn off, or the like.

Figure 1C:
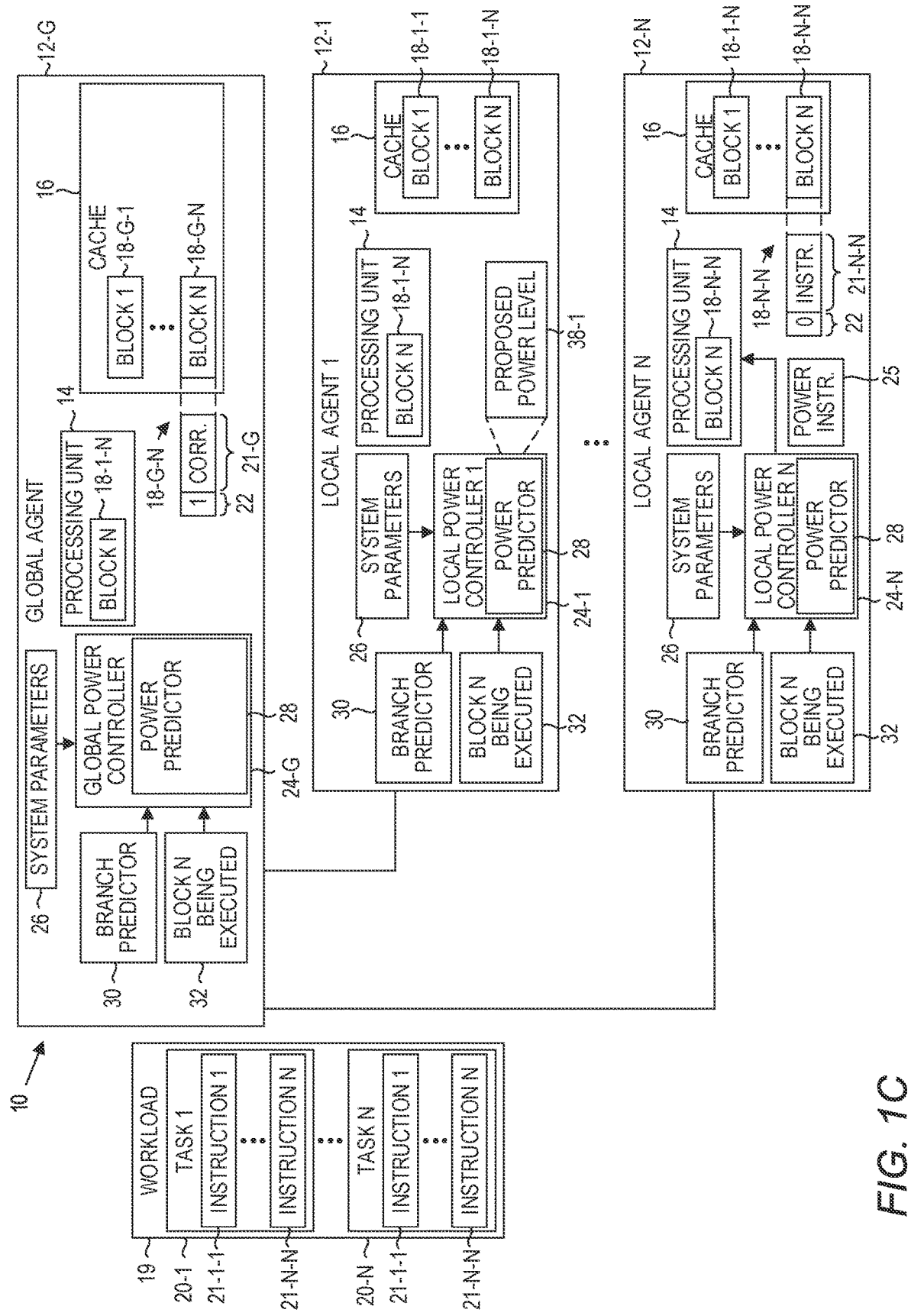

Referring now to FIG. 1C, at a point in time subsequent to that illustrated in FIG. 1B, the local power controller 24-1 determines that an agent instruction 21-1-N in the cache block 18-N is to be executed by the processing unit 14 of the local agent 12-1 at a future point in time. The power predictor 28 of the local agent 12-1 may make this determination based on information received from the branch predictor 30 of the local agent 12-1. The power predictor 28 of the local agent 12-1 accesses the instruction power level 36 previously stored in the metadata 22 of the cache block 18-N. Prior to the processing unit 14 executing the agent instructions 21-1-N, the power predictor 28 of the local power controller 24-1 of the local agent 12-1 generates and/or communicates a proposed power level 38-1 that is based on the instruction power level 36-1. The proposed power level 38-1 may be the same value as the instruction power level 36-1 or may be translated to a different value. In some implementations, the proposed power level 38-1 and the instruction power level 36-1 is a DVFS state. The power controller 24-1 determines a current power level of the processing unit 14 of the local agent 12-1 and, if suitable, generates new power instructions 25 in accordance with the proposed power level 38 and sends the new power instructions 25 to the processing unit 14 of the local agent 12-1.

Figure 1D:
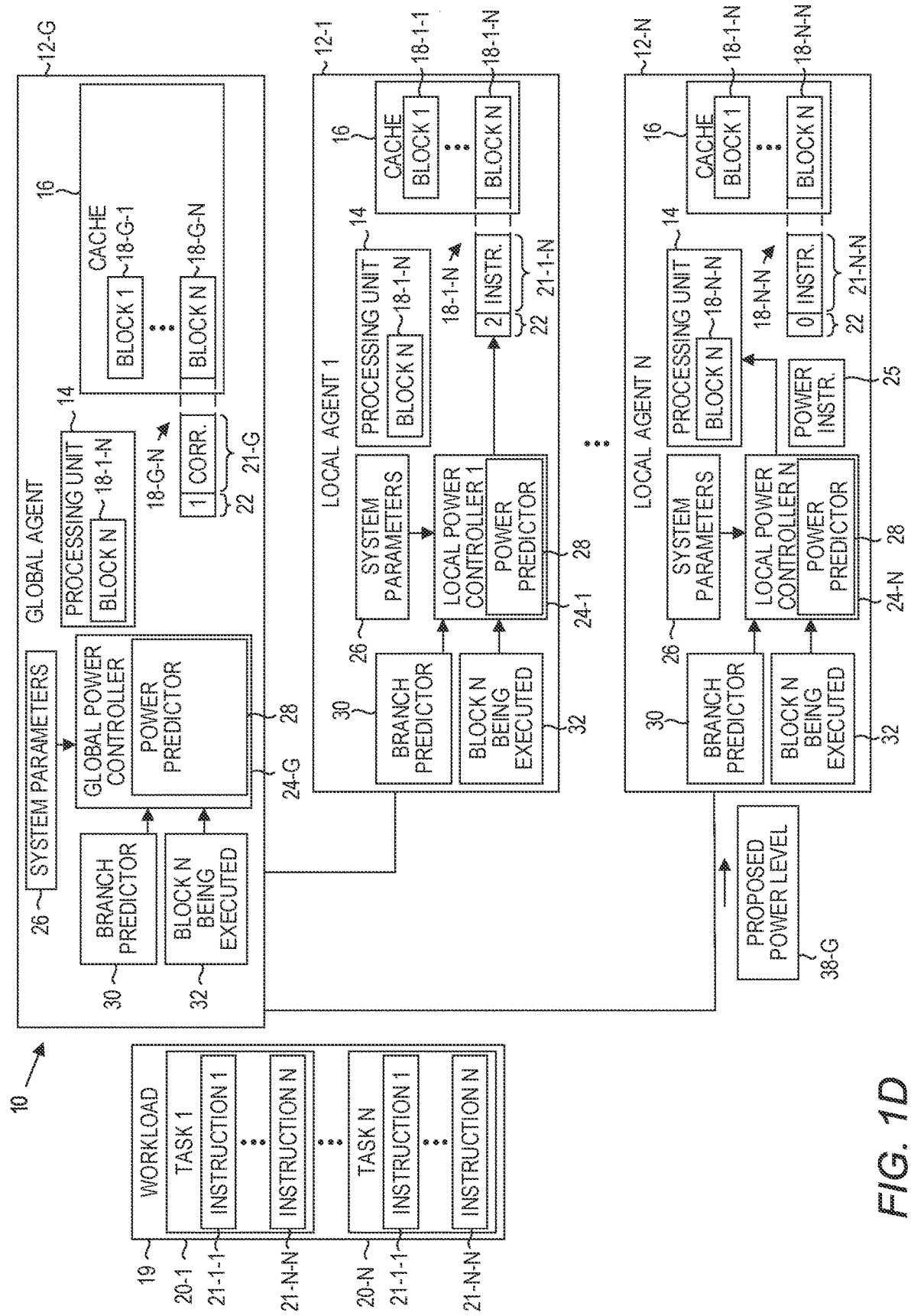

Referring now to FIG. 1D, at a point in time subsequent to that illustrated in FIG. 1B and/or 1C, the global agent 12-G determines that an agent instruction 21 in local agent 12-1 is executing or is to be executed by the local agent 12-1. The power predictor 28 of the global agent 12-G may make this determination based on executing information 32 received from the local agent 12-1 and/or from a shared library, or the like. The power predictor 28 of the global agent 12-G accesses the correlation 36-G previously stored in the metadata 22 of the cache block 18-G-N. The power predictor 28 of the global power controller 24-G of the global agent 12-G generates and/or communicates a proposed power level 38-G that is based on the correlation 36-G. The proposed power level 38-G may be the same value as the correlation 36-G or may be translated to a different value. In some implementations, the proposed power level 38-G is a DVFS state. The power controller 24-N of the local agent 12-N determines a current power level 36 of the processing unit 14 of the local agent 12-N and, if suitable, generates new power instructions 25 in accordance with the proposed power level 38-G and sends the new power instructions 25 to the processing unit 14 of the local agent 12-N.

In this way, when the local agent 12-1 is executing agent instructions 21-1-N, the global agent 12-G is also aware of the power requirements and behavior of other local agents 12-N. The global agent 12-G may then make a correlation between execution of agent instruction 21-1-N by the local agent 12-1 and operation of local agent 12-N. The global agent 12-G may determine that local agent 12-N has certain power requirements concurrently or consecutively with execution of agent instruction 21-1-N by the local agent 12-1. For example, global agent 12-G may determine that execution of an agent instruction 21-1-N by a processor core often results in a GPU requiring more power. In certain implementations, the global agent includes machine learning for improved and adaptable power predictions. Further, although only one correlation is discussed, the global agent 12-G is able to correlate multiple local agents 12, which each may be executing multiple instructions 21 consecutively and/or concurrently.

Figure 2:
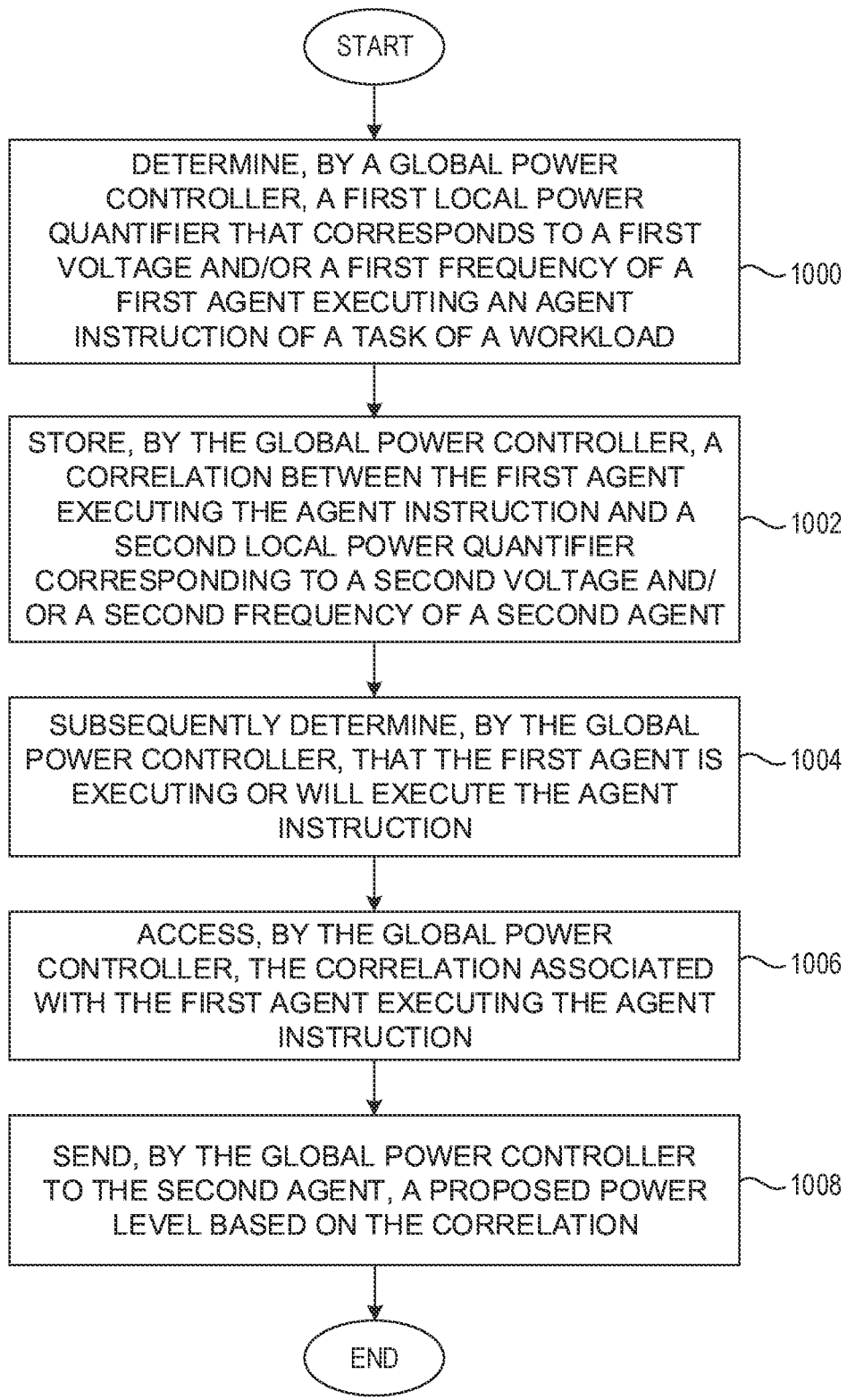
FIG. 2 is a flowchart of a method for coordinating dynamic power scaling of agents based on power correlations of agent instructions according to one example.

FIG. 2 is a flowchart of a method for coordinating dynamic power scaling of agents based on power correlations of agent instructions. FIG. 2 will be discussed in conjunction with FIGS. 1A-1D. A global power controller determines a first local power quantifier that corresponds to a first voltage and/or a first frequency of a first agent executing an agent instruction of a task of a workload (1000). The global power controller stores a correlation between the first agent executing the agent instruction and a second local power quantifier corresponding to a second voltage and/or a second frequency of a second agent (1002). The global power controller subsequently determines that the first agent is executing or will execute the agent instruction (1004). The global power controller accesses the correlation associated with the first agent executing the agent instruction (1006). The global power controller sends to the second agent, a proposed power level based on the correlation (1008).

Figure 3:
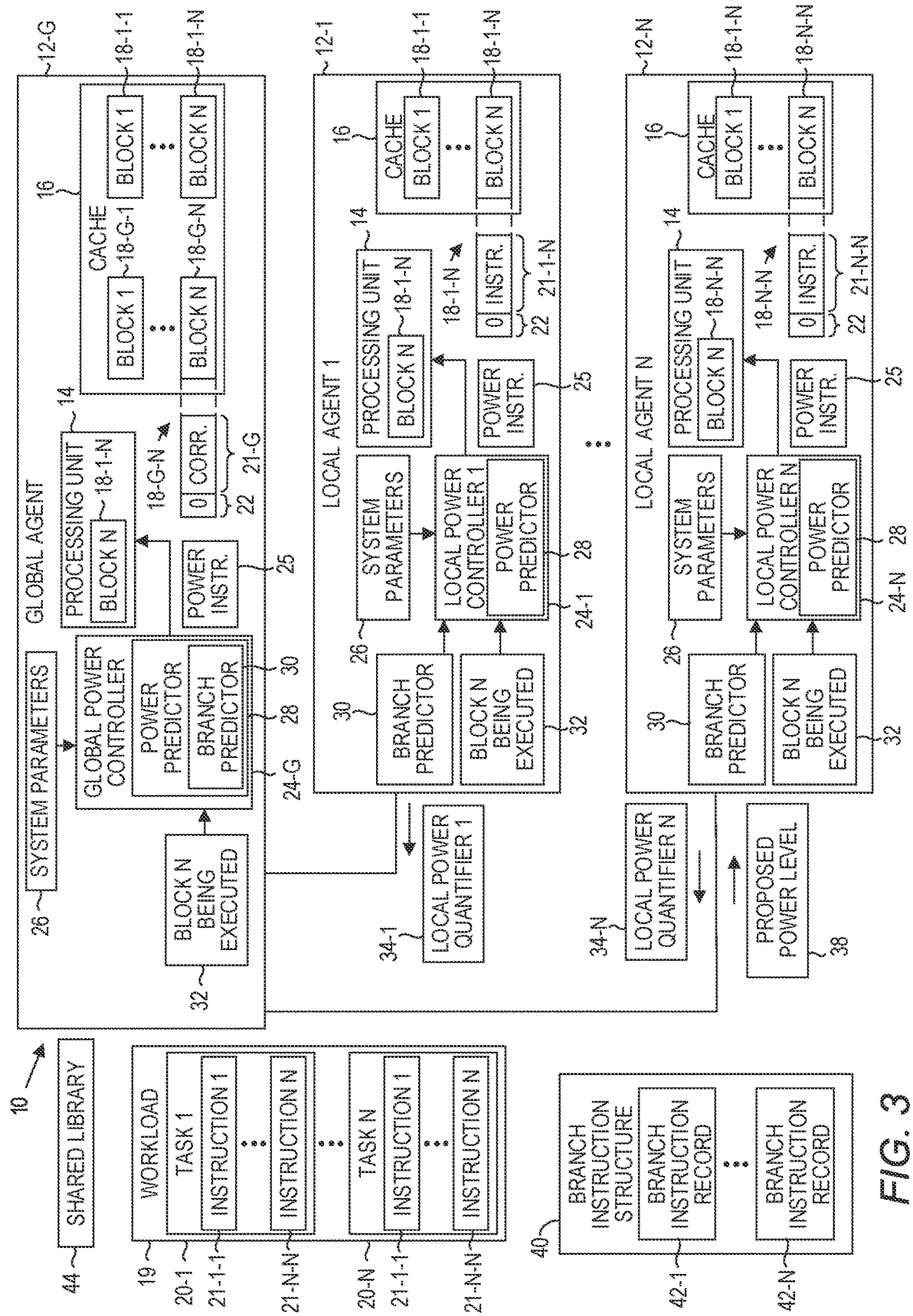
FIG. 3 is a block diagram of the system according to another example.

FIG. 3 is a block diagram of the system 10, according to another example. In this example, the power predictor 28 may include the branch predictor 30. Although the global agent 12-G includes the branch predictor 30 within the power predictor 28, the local agents 12-1, 12-N may include similar structure and/or functionality as that described below.

In this example, the branch predictor 30 maintains a branch instruction structure 40 in which the branch predictor 30 stores a plurality of branch instruction records 42-1-42-N (generally, branch instruction records 42), each branch instruction record 42 corresponding to a particular branch instruction, such as a processor branch instruction. The terms "processor branch instruction" and "branch instruction" as used herein refers to an instruction that, upon execution, causes the execution of a different instruction sequence than the instructions that successively follow the branch instruction.

In this example, the power predictor 28 of the agents 12 stores the instruction power level 36 in the branch instruction record 42 corresponding to the processor branch instruction that immediately preceded the execution of the corresponding agent instructions 21. In some examples, each branch instruction record 42 may include some function, such as, by way of non-limiting example, a bloom filter that receives a plurality of instruction power levels over time and, upon request, provides a particular instruction power level 36 to the power predictor 28. In particular, the power predictor 28 may associate a bloom filter with each branch instruction record 42. The bloom filter is populated over time. The bloom filter is then interrogated to determine which instruction power level 36 should be provided to the power controller 24. In some implementations, a secondary prediction circuit may determine whether the bloom filter is frequently returning incorrect predictions, in which case the bloom filter may be flushed (causing it to be repopulated) or temporarily disabled.

When the branch predictor 30 determines that a particular branch instruction is to be imminently executed, the power predictor 28 accesses the branch instruction record 42 that corresponds to the branch instruction, retrieves an instruction power level 36-1 and/or correlation 36-G from the branch instruction record 42, and provides a proposed power level to the power controller 24-G, 24-1, 24-N prior to execution of the branch instruction by the processor unit 14.

The system 10 may further include a shared library 44 that may include data, files, objects, or the like that are shared across multiple agents 12. Accordingly, the global agent 12-G may utilize the shared library 44 to determine and anticipate correlations between agents 12. In other words, the global power controller 24-G determines the local power quantifier 34-1, 34-N, and/or proposed power level 36-G based on the shared library 44 and/or use thereof. In certain implementations, the global agent 12-G incorporates machine learning algorithms for predicting power requirements of the local agents 12-1, 12-N.

Figure 4A:
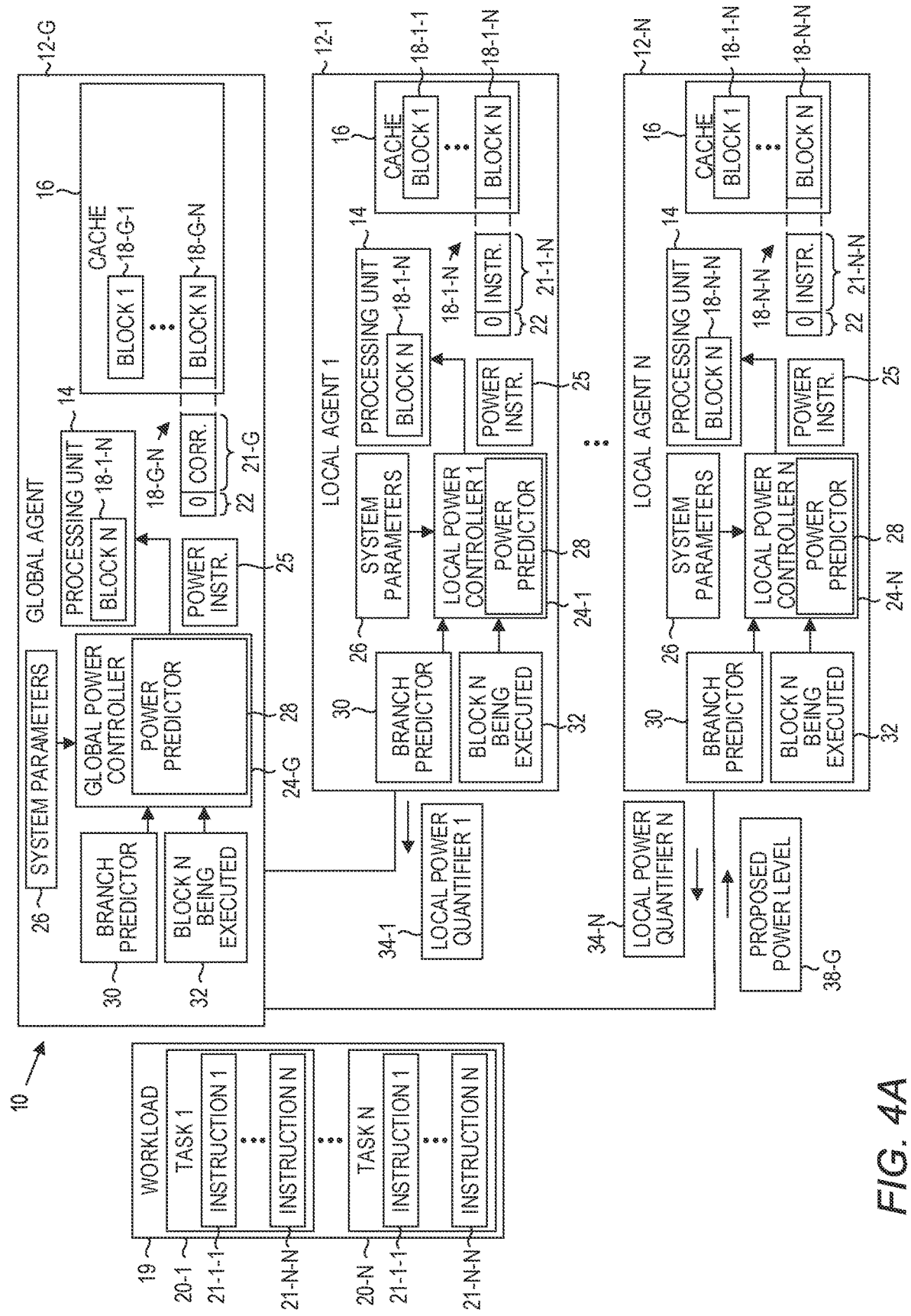
FIGS. 4A-4B are block diagrams of the system according to another example.
Figure 4B:
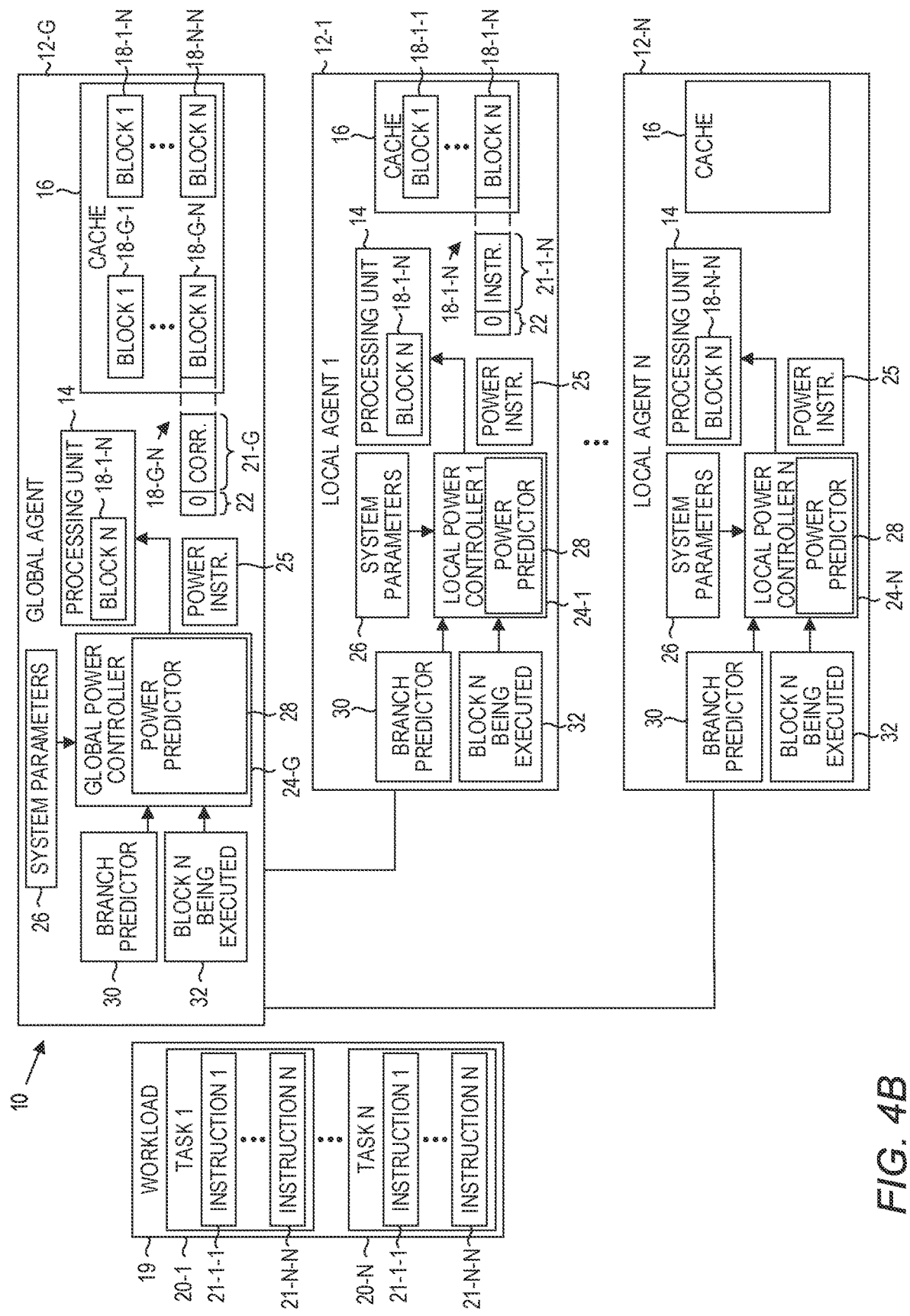

FIGS. 4A-4B are block diagrams of the system 10, according to another example. Referring to FIG. 4A, in certain implementations, the proposed power level 38-G may be a request to turn off the local agent 12-N. In other words, the global power controller 24-G may direct the local power controller 24-N of the agent 12-N to turn off. Referring to FIG. 4B, in such circumstances, the local agent 12-N may send instruction power levels 36-N and/or metadata 22 to be temporarily stored with the global agent 12-G. In this way, the local agent 12-N sends the global agent 12-G the instruction power levels 36-N specific to the local agent 12-N. When the local agent 12-N turns back on, the global agent 12-G may send the instruction power levels 36-N and/or metadata 22 back to the local agent 12-N to locally store in a particular cache block 18-N. Accordingly, the local performance of the local agent 12-N is temporarily stored elsewhere while the power for that local agent 12-N may be redirected elsewhere for increased power efficiency.

Figure 5:
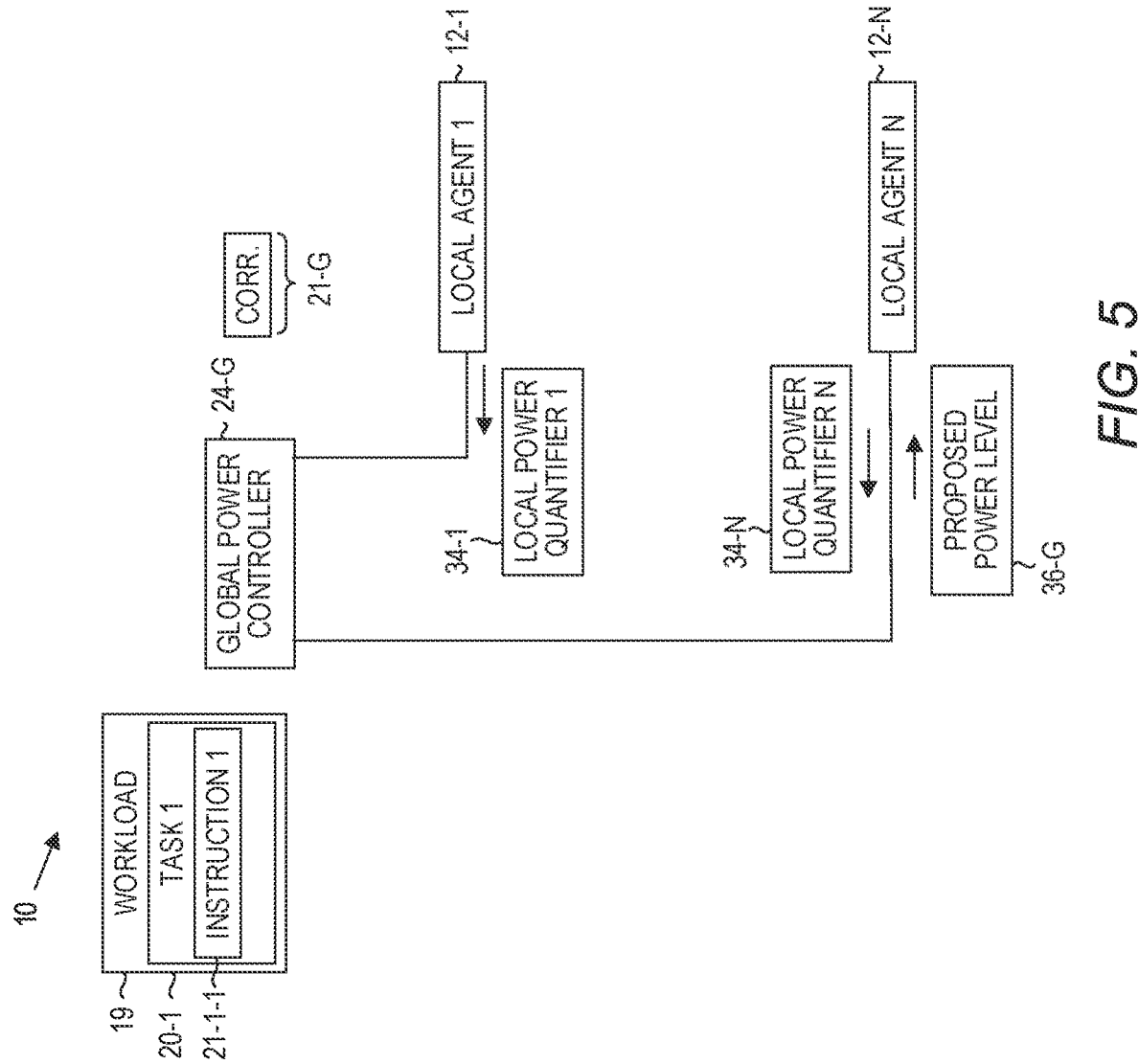
FIG. 5 is a simplified block diagram of the processor device illustrated in FIGS. 1A-1C according to one implementation.

FIG. 5 is a simplified block diagram of the system 10, according to one implementation. The system 10 includes a global power controller 24-G to determine a first local power quantifier 34-1 that corresponds to a first voltage and/or a first frequency of a first agent 12-1 executing an agent instruction 21-1-1 of a task 20-1 of a workload 19. The global power controller 24-G stores a correlation 21-G between the first agent 12-1 executing the agent instruction 21-1-1 and a second local power quantifier 34-N corresponding to a second voltage and/or a second frequency of a second agent 12-N. The global power controller 24-G subsequently determines that the first agent 12-1 is executing or will execute the agent instruction 21-1-1. The global power controller 24-G accesses the correlation 21-G associated with the first agent 12-1 executing the agent instruction 21-1-1. The global power controller 24-G sends to the second agent 12-N, a proposed power level 38 based on the correlation 21-G.

Figure 6A:
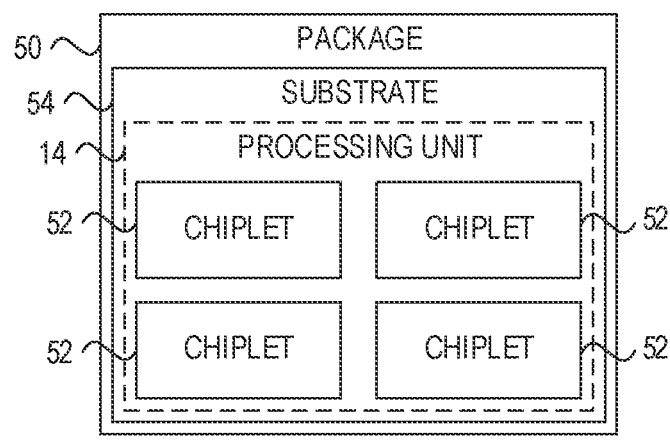
FIG. 6A is a top view of a package with a plurality of chiplets.
Figure 6B:
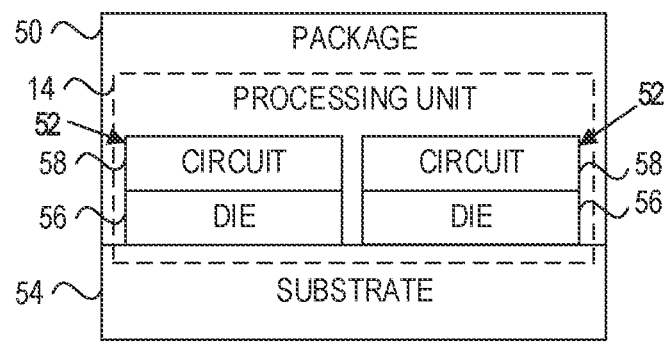
FIG. 6B is a side view of the package of FIG. 6A with the plurality chiplets.

FIGS. 6A-6B are views of a package 50 with a plurality of chiplets 52 mounted to a substrate 54. In certain implementations, the global power controller 24-G and/or the global agent 12-G are associated with a first chiplet 52, and the local power controller 24-1 and/or the local agents 12-1-N are associated with another one or more chiplets 52.

As noted above, chiplets 52 are sub-processing units that collectively form a processing unit 14 of a package 50. A chiplet 52 has an integrated circuit block, often made of one or more reusable IP (intellectual property) blocks, designed to work with other chiplets 52 to form more complex chips. Chiplets 52 may have different functions at different nodes and provide a modular design to the building of processing units 14.

Each chiplet 52 includes a die 56, a functional circuit 58 hosted by the die 56, and a physical interface. The die 56 is pre-developed before integration into the package 50. The die 56 is a small block of semiconducting material, such as silicon (EGS) and/or GaAs, on which a circuit 58 is fabricated, such as by photolithography. The functional circuit 58 relates to an IP block, providing some function of the package 50. For example, chiplets 52 may form CPU cores, GPU, memory, communication, input/output, or the like. The functional circuit may also be referred to as a processor device, although the processor device of the chiplet 52 forms only a portion of the processing unit 14 of the package 50. The physical interface may include a die-to-die interconnect to join one die to another die in the package 50. Die-to-die interconnects may include, for example, Advanced Interface Bus (AIB) Base, AIB Plus, CEI-112G-XSR, Bunch of Wires (BoW), OpenHBI, high-bandwidth memory (HBM), XRS, or the like.

The chiplets 52 are mounted to one side of the substrate 54. However, in other implementations, the chiplets 52 may be mounted to both sides of the substrate 54. In certain implementations, the chiplets 52 may be stacked in a three-dimensional configuration.

Figure 7:
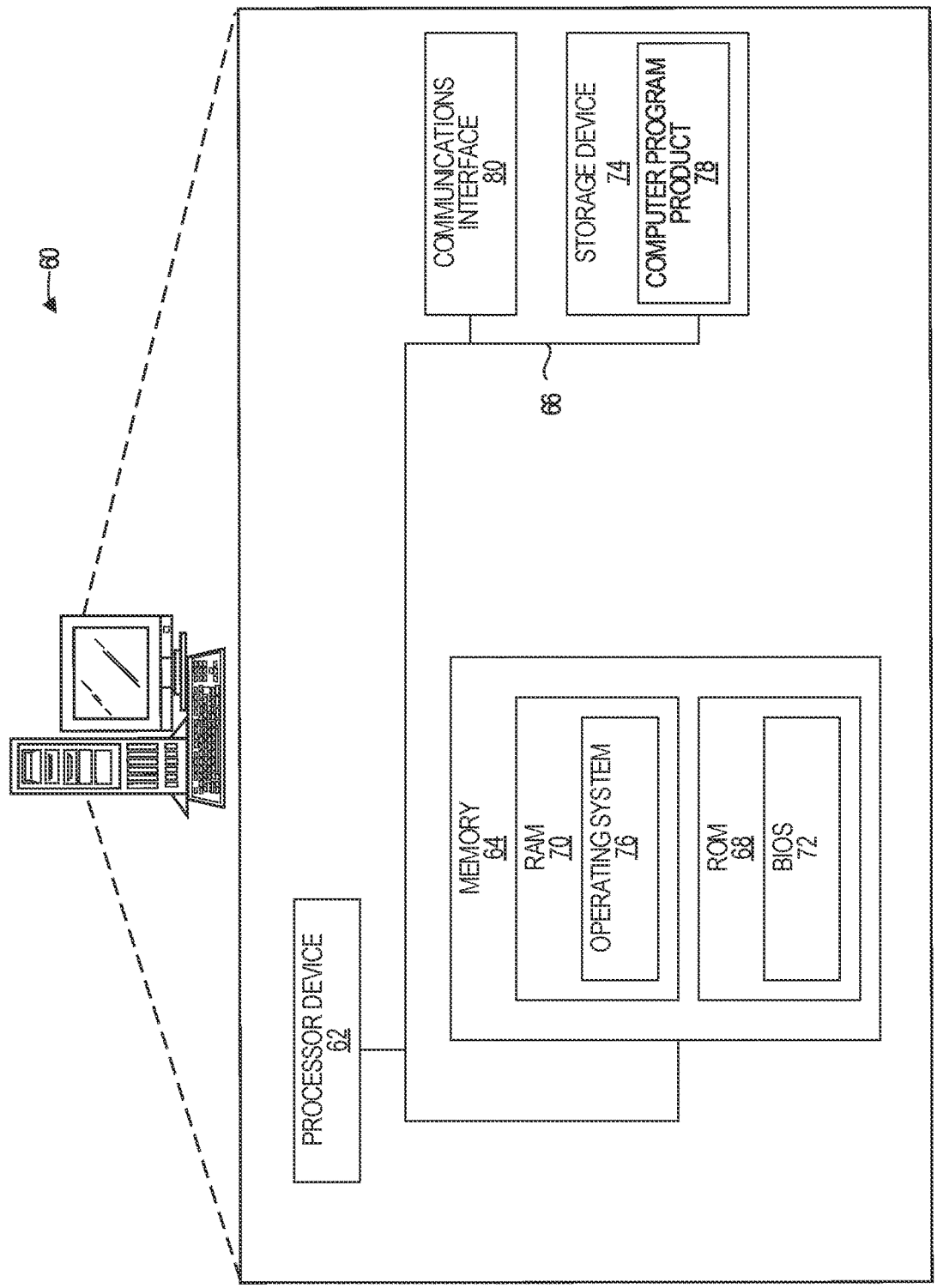
FIG. 7 is a block diagram of a computing device suitable for implementing one or more of the processing devices disclosed herein, according to one implementation.

FIG. 7 is a block diagram of a computing device 60 containing components suitable for implementing any of the processing devices disclosed herein. The computing device 60 includes a processor device 62, a system memory 64, and a system bus 66. The system bus 66 provides an interface for system components including, but not limited to, the system memory 64 and the processor device 62. The processor device 62 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The system memory 64 may include non-volatile memory 68 (e.g., read-only memory (ROM), erasable programmable read-only memory (EPROM), electrically erasable programmable read-only memory (EEPROM), etc.), and volatile memory 70 (e.g., random-access memory (RAM)). A basic input/output system (BIOS) 72 may be stored in the non-volatile memory 68 and can include the basic routines that help transfer information between elements within the computing device 60. The volatile memory 70 may also include a high-speed RAM, such as static RAM, for caching data.

The computing device 60 may further include or be coupled to a non-transitory computer-readable storage medium such as the storage device 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 74 and other drives associated with computer-readable media and computer-usable media may provide non-volatile storage of data, data structures, computer-executable instructions, and the like.

A number of modules can be stored in the storage device 74 and in the volatile memory 70, including an operating system 76 and one or more program modules, which may implement the functionality described herein in whole or in part. All or a portion of the examples may be implemented as a computer program product 78 stored on a transitory or non-transitory computer-usable or computer-readable storage medium, such as the storage device 74, which includes complex programming instructions, such as complex computer-readable program code, to cause the processor device 62 to carry out the steps described herein. Thus, the computer-readable program code can comprise software instructions for implementing the functionality of the examples described herein when executed on the processor device 62. The processor device 62, in conjunction with the network manager in the volatile memory 70, may serve as a controller or control system for the computing device 60 that is to implement the functionality described herein.

The computing device 60 may also include one or more communication interfaces 80, depending on the particular functionality of the computing device 60. The communication interfaces 80 may comprise one or more wired Ethernet transceivers, wireless transceivers, fiber, satellite, and/or coaxial interfaces by way of non-limiting examples.

Individuals will recognize improvements and modifications to the preferred examples of the disclosure. All such improvements and modifications are considered within the scope of the concepts disclosed herein and the claims that follow.

What is claimed is:

1. A method comprising:
    determining, by a global power controller, a first local power quantifier that corresponds to a first voltage and/or a first frequency of a first agent executing an agent instruction of a task of a workload;
    storing, by the global power controller, a correlation between the first agent executing the agent instruction and a second local power quantifier corresponding to a second voltage and/or a second frequency of a second agent;
    subsequently determining, by the global power controller, that the first agent is executing or will execute the agent instruction;
    accessing, by the global power controller, the correlation associated with the first agent executing the agent instruction; and
    sending, by the global power controller to the second agent, a proposed power level based on the correlation.

2. The method of claim 1, wherein the global power controller is associated with a first chiplet and the first agent is associated with a second chiplet.

3. The method of claim 1, wherein determining, by the global power controller, the first local power quantifier that corresponds to the first voltage and/or the first frequency of the first agent executing the agent instruction of the task of the workload comprises:
    receiving, by the global power controller from a first local power controller of the first agent, the first local power quantifier.

4. The method of claim 1, wherein determining, by the global power controller, the first local power quantifier that corresponds to the first voltage and/or the first frequency of the first agent executing the agent instruction of the task of the workload comprises:
    determining, by the global power controller, the first local power quantifier based on a shared library.

5. The method of claim 1, wherein the agent instruction is executed by the first agent within one nanosecond.

6. The method of claim 1, wherein the second agent comprises at least one of a central processing unit (CPU), a graphical processing unit (GPU), a memory, a communication unit, or an input/output unit.

7. The method of claim 1, wherein storing, by the global power controller, the correlation between the first agent executing the agent instruction and the second local power quantifier corresponding to the second voltage and/or the second frequency of the second agent comprises:
    determining a particular cache block of a plurality of cache blocks in a memory cache that corresponds to the agent instruction, each cache block comprising data that identifies a respective instruction and metadata about the respective instruction; and
    storing, in metadata of the particular cache block, the correlation.

8. The method of claim 1 further comprising storing, by a first local power controller, an instruction power level in association with the agent instruction of the task of the workload comprising:
    determining a particular cache block of a plurality of cache blocks in a memory cache that corresponds to the agent instruction, each cache block comprising data that identifies a respective instruction and metadata about the respective instruction; and
    storing, in metadata of the particular cache block, the instruction power level.

9. The method of claim 1 further comprising:
directing, by the global power controller, a second local power controller to turn off;
receiving, by the global power controller, from the second agent an instruction power level; and
storing, in metadata of a cache block of the global power controller, the instruction power level.

10. The method of claim 9 further comprising:
directing, by the global power controller, the second local power controller to turn on; and
sending, by the global power controller, the instruction power level to the second agent to locally store the instruction power level in a particular cache block.

11. The method of claim 1, wherein subsequently determining, by the global power controller, that the first agent is executing or will execute the agent instruction comprises:
subsequently determining, by the global power controller, that the first agent is executing the agent instruction.

12. The method of claim 1, wherein subsequently determining, by the global power controller, that the first agent is executing or will execute the agent instruction comprises:
subsequently determining, by the global power controller, that the first agent will execute the agent instruction.

13. The method of claim 1, further comprising:
storing, by the first agent, based on the first local power quantifier, an instruction power level in association with the agent instruction;
subsequently determining, by a first local power controller, that the agent instruction is to be executed; and
accessing, by the first local power controller, the instruction power level previously stored in association with the agent instruction.

14. The method of claim 1, wherein sending, by the global power controller to the second agent, the proposed power level to the second agent based on the correlation comprises:
sending, by the global power controller to the second agent, the proposed power level to a second power controller of the second agent based on the correlation.

15. The method of claim 1, wherein the proposed power level corresponds to turning on or off the second agent.

16. The method of claim 1, wherein the proposed power level comprises a dynamic voltage and frequency scaling (DVFS) power state.

17. The method of claim 1, wherein the correlation corresponds to a particular frequency.

18. The method of claim 1, wherein the correlation corresponds to a particular voltage.

19. A system, comprising:
one or more processor devices to:
determine, by a global power controller, a first local power quantifier that corresponds to a first voltage and/or a first frequency of a first agent executing an agent instruction of a task of a workload;
store, by the global power controller, a correlation between the first agent executing the agent instruction and a second local power quantifier corresponding to a second voltage and/or a second frequency of a second agent;
subsequently determine, by the global power controller, that the first agent is executing or will execute the agent instruction;
access, by the global power controller, the correlation associated with the first agent executing the agent instruction; and
send, by the global power controller to the second agent, a proposed power level based on the correlation.

20. A computer program product stored on a non-transitory computer-readable storage medium and including instructions to cause a processor device to:
determine, by a global power controller, a first local power quantifier that corresponds to a first voltage and/or a first frequency of a first agent executing an agent instruction of a task of a workload;
store, by the global power controller, a correlation between the first agent executing the agent instruction and a second local power quantifier corresponding to a second voltage and/or a second frequency of a second agent;
subsequently determine, by the global power controller, that the first agent is executing or will execute the agent instruction;
access, by the global power controller, the correlation associated with the first agent executing the agent instruction; and
send, by the global power controller to the second agent, a proposed power level based on the correlation.

* * * * *